(12) United States Patent
Robinson et al.

(10) Patent No.: US 11,780,528 B2
(45) Date of Patent: Oct. 10, 2023

(54) ADJUSTABLE HEAD ANGLE BICYCLES

(71) Applicant: SPECIALIZED BICYCLE COMPONENTS, INC., Morgan Hill, CA (US)

(72) Inventors: Brian Daniel Robinson, Morgan Hill, CA (US); Jeffrey Keith Bowers, Bellingham, WA (US); William Te-Chung Chan, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 272 days.

(21) Appl. No.: 16/990,817

(22) Filed: Aug. 11, 2020

(65) Prior Publication Data
US 2021/0362798 A1 Nov. 25, 2021

Related U.S. Application Data

(60) Provisional application No. 63/028,181, filed on May 21, 2020.

(51) Int. Cl.
*B62K 21/06* (2006.01)
*B62K 19/32* (2006.01)

(52) U.S. Cl.
CPC .............. *B62K 21/06* (2013.01); *B62K 19/32* (2013.01)

(58) Field of Classification Search
CPC ......... B62K 21/08; B62K 21/02; B62K 21/22
USPC ....................................................... 280/279
See application file for complete search history.

(56) References Cited

U.S. PATENT DOCUMENTS

| 1,044,055 | A |   | 11/1912 | Johnson et al. |   |
|---|---|---|---|---|---|
| 1,213,599 | A |   | 1/1917 | Dow |   |
| 3,408,924 | A |   | 11/1968 | Mueller |   |
| 3,747,168 | A |   | 7/1973 | Snarskis |   |
| 3,866,946 | A | * | 2/1975 | Robison | B62K 19/32 384/255 |
| 4,700,963 | A | * | 10/1987 | Burns | B62K 21/02 180/219 |
| 5,095,770 | A |   | 3/1992 | Rader |   |
| 5,938,225 | A | * | 8/1999 | Scheibe | B62K 21/06 384/619 |

(Continued)

FOREIGN PATENT DOCUMENTS

| CN | 2092488 | U |   | 1/1992 |
|---|---|---|---|---|
| CN | 114715320 | A | * | 7/2022 |

(Continued)

OTHER PUBLICATIONS

DE-102011086127-A1 English Translation of Desciption Retrieved from Espacenet Dec. 2022 (Year: 2022).*

(Continued)

*Primary Examiner* — Kevin Hurley
(74) *Attorney, Agent, or Firm* — KNOBBE, MARTENS, OLSON & BEAR, LLP

(57) ABSTRACT

An adjustable head angle bicycle assembly includes a steerer tube; a head tube that includes a first annular surface protruding radially inward from an inner wall at the upper end, and a second annular surface protruding radially inward from the inner wall at the lower end; an upper cup that includes a third annular surface engaged with the first annular surface of the head tube; and a lower cup that includes a fourth annular surface engaged with the second annular surface of the head tube.

22 Claims, 9 Drawing Sheets

(56) References Cited

U.S. PATENT DOCUMENTS

| | | | |
|---|---|---|---|
| 6,783,158 B2* | 8/2004 | Nakagawa | B62K 5/00 |
| | | | 180/311 |
| 6,877,591 B1 | 4/2005 | Hso | |
| 6,895,834 B1 | 5/2005 | Baatz | |
| 7,360,963 B1* | 4/2008 | Burns | B62K 21/06 |
| | | | 403/177 |
| 7,438,306 B2* | 10/2008 | Mrdeza | B62K 21/04 |
| | | | 280/274 |
| 7,699,332 B2* | 4/2010 | Lai | B62K 21/16 |
| | | | 280/279 |
| 7,726,927 B2 | 6/2010 | Cook | |
| 8,006,993 B1 | 8/2011 | Chamberlain | |
| 8,430,415 B2 | 4/2013 | Earle | |
| 8,931,794 B2 | 1/2015 | O'Connor | |
| 9,021,902 B2 | 5/2015 | Chu et al. | |
| 9,079,631 B1* | 7/2015 | Costa | B62K 21/22 |
| 9,534,624 B2* | 1/2017 | Rautionmaa | E02F 3/3613 |
| 10,549,808 B2* | 2/2020 | Thompson | B62K 19/32 |
| RE48,786 E * | 10/2021 | Lee | B62K 21/22 |
| 2005/0223842 A1* | 10/2005 | Dube | B62K 21/22 |
| | | | 74/551.1 |
| 2006/0055146 A1* | 3/2006 | Ueno | B62K 21/06 |
| | | | 280/280 |
| 2006/0113745 A1* | 6/2006 | Lagar | B62K 21/18 |
| | | | 280/279 |
| 2008/0018076 A1* | 1/2008 | Lagar | B62K 21/06 |
| | | | 280/281.1 |
| 2009/0134598 A1 | 5/2009 | Mckernan et al. | |
| 2011/0148070 A1* | 6/2011 | Lanz | B62K 19/32 |
| | | | 280/279 |
| 2011/0204590 A1* | 8/2011 | Delpit | B62K 21/04 |
| | | | 280/276 |
| 2012/0153595 A1* | 6/2012 | Lin | B62K 21/06 |
| | | | 280/279 |
| 2015/0014498 A1 | 1/2015 | Hock | |
| 2019/0002054 A1* | 1/2019 | Pazzaglia | B62K 21/22 |
| 2019/0308688 A1* | 10/2019 | Chamberlain | B62K 3/02 |
| 2020/0124131 A1* | 4/2020 | Fillep | F16F 15/1204 |
| 2021/0031864 A1* | 2/2021 | Prater | B62K 19/32 |
| 2021/0362798 A1* | 11/2021 | Robinson | B62K 21/06 |

FOREIGN PATENT DOCUMENTS

| | | | | |
|---|---|---|---|---|
| DE | 19607434 A1 * | 9/1996 | | B62K 21/04 |
| DE | 102011086127 | 5/2013 | | |
| DE | 102011086127 A1 * | 5/2013 | | B62K 21/06 |
| DE | 102013106273 A1 * | 12/2014 | | B62J 1/08 |
| DE | 102015106905 B4 | 6/2017 | | |
| DE | 102017119483 A1 * | 2/2019 | | |
| DE | 202017007497 U1 * | 3/2022 | | |
| EP | 2090504 A2 * | 8/2009 | | B62K 19/32 |
| EP | 3 339 153 A2 | 6/2018 | | |
| ES | 2681999 A1 * | 9/2018 | | B62K 21/06 |
| FR | 761012 A * | 3/1934 | | |
| GB | 651948 | 4/1951 | | |
| JP | 3548270 B2 | 7/2004 | | |
| JP | 2013204798 A | 10/2013 | | |
| KR | 20080095157 A * | 10/2008 | | |
| WO | WO-2008130098 A1 * | 10/2008 | | B62K 19/32 |
| WO | WO-2021255649 A1 * | 12/2021 | | |

OTHER PUBLICATIONS

"AngleSet—Cane Creek Cycling Components" https://www.canecreek.com/product/angleset/, Sep. 15, 2019.

* cited by examiner

ADJUSTABLE HEAD ANGLE BICYCLES

CROSS-REFERENCE TO RELATED APPLICATIONS

This application claims the benefit of U.S. Provisional Application No. 63/028,181, titled ADJUSTABLE HEAD ANGLE BICYCLES, filed on May 21, 2020, which is hereby incorporated by reference herein in its entirety.

TECHNICAL FIELD

The present technology relates generally to bicycles. More particularly, the present technology relates to bicycles having adjustable geometry.

DESCRIPTION OF THE RELATED TECHNOLOGY

A bicycle's geometry determines how the bicycle will handle when ridden.

SUMMARY

The systems, methods, and devices described herein have innovative aspects, no single one of which is indispensable or solely responsible for their desirable attributes. Without limiting the scope of the claims, some of the advantageous features will now be summarized.

One aspect, is the recognition that a bicycle's geometry is defined by a variety of parameters such as seat tube length, stack height, down tube length, bottom bracket drop, head angle, trail, stem length, and others. Further, there is the recognition that changes to one or more of these parameters can have a significant effect on how a bicycle handles, and different geometries may be optimal in different riding conditions.

One important geometry parameter is head angle, sometimes referred to as steering angle, caster angle, and/or the steepness of the steering axis. The head angle is the angle of a bicycle's steering axis measured with respect to horizontal. Specifically, the head angle is an acute angle that is measured from the portion of the steering axis that extends above a horizontal surface the bicycle is resting on, to the portion of the horizontal surface that is rearward of the point where the steering axis intersects the horizontal surface. In general, a slacker (e.g., smaller) head angle can reduce the likelihood that a bicycle pitches forward on a steep descent, and a steeper (e.g., larger) head angle can help to avoid understeer.

The present disclosure describes bicycles having an adjustable head angle. In some aspects, a bicycle comprises a lightweight and easy to use assembly for adjusting a bicycle's head angle. The system may be rider-adjustable in the field using no tools or a minimal amount of easy to carry tools, such as a screwdriver, hex key, star driver, or the like. In some aspects, the system comprises an adjustable headset assembly that comprises an upper cup and a lower cup, with one of the cups being a control cup that lets a rider select a head angle, and the other cup being a subordinate cup that follows or conforms to the angle set by the control cup. In some aspects, the control cup is the upper cup, and the subordinate cup is the lower cup. Such a configuration may be desirable, for example, to allow easy adjustment to the head angle in the field by only adjusting and/or replacing the upper cup, without having to disassemble the bicycle fork from the main frame. In some aspects, the cups of the adjustable headset assembly comprise curved surfaces that interface with mating curved surfaces of the head tube, allowing rotation of the cups with respect to the head tube when the head angle is adjusted. In some aspects, the curved surfaces comprise a spherical radius.

According to some aspects, a bicycle comprises: a frame comprising a head tube, the head tube comprising an upper receiving portion and a lower receiving portion, the upper receiving portion comprising an upward facing curved surface, the lower receiving portion comprising a downward facing curved surface; a front fork assembly comprising a steerer tube; a rear wheel rotatably coupled to the frame; a front wheel rotatably coupled to the front fork assembly; and an adjustable headset assembly that rotatably couples the steerer tube to the head tube about a steering axis, the adjustable headset assembly being configurable to adjust the orientation of the steering axis with respect to the head tube to change a head angle of the bicycle, wherein the adjustable headset assembly comprises: an upper cup receivable in the upper receiving portion of the head tube, the upper cup comprising a downward facing curved surface having a curvature that is complementary to the upward facing curved surface of the upper receiving portion; an upper bearing comprising an outer race that engages an inner surface of the upper cup and an inner race that engages the steerer tube; a lower cup receivable in the lower receiving portion of the head tube, the lower cup comprising an upward facing curved surface having a curvature that is complementary to the downward facing curved surface of the lower receiving portion; and a lower bearing comprising an outer race that engages an inner surface of the lower cup and an inner race that engages the steerer tube, wherein the inner surface of at least one of the upper cup or lower cup permits the steering axis to be positioned offset from an axis defined by the head tube.

In some aspects, the inner surface of the at least one of the upper cup or lower cup permits the steering axis to be positioned in a first position offset from the axis defined by the head tube and a second position offset from the axis defined by the head tube. In some aspects, the at least one of the upper cup or lower cup is receivable in the upper or lower receiving portion of the head tube in at least a first orientation and a second orientation, the first orientation defining a first head angle, and the second orientation defining a second head angle that is different than the first head angle. In some aspects, the at least one of the upper cup or lower cup comprises a protrusion or a recessed portion that engages a corresponding protrusion or recessed portion of the head tube to resist rotation of the at least one of the upper cup or lower cup with respect to the upper or lower receiving portion of the head tube. In some aspects, the at least one of the upper cup or lower cup comprises at least one surface having a non-circular shape that engages a corresponding non-circular shaped surface of the head tube to resist rotation of the at least one of the upper cup or lower cup with respect to the upper or lower receiving portion of the head tube. In some aspects, the at least one of the upper cup or lower cup is removable and replaceable with a third cup that comprises a different relative positioning of inner surface to curved surface. In some aspects, the curved surfaces of the receiving portions and cups each comprise a spherical radius of curvature. In some aspects, the spherical radius of curvature for each of the curved surfaces of the receiving portions and cups is within a range of 30-50 mm. In some aspects, the inner surface of the upper cup defines the axis that is offset from the axis defined by the curved surface of the upper cup, and an axis defined by the inner surface of the lower cup is not offset from an axis defined by the curved surface of the lower cup. In some aspects, the axis defined by the inner surface of the upper cup is offset from the axis defined by the curved surface of the upper cup by 2-8 mm. In some aspects, the upper cup and the lower cup are sized such that they do not form an interference fit with their respective receiving portion of the head tube. In some aspects, the upper receiving portion and lower receiving portion are integrally formed in the head tube. In some aspects, the frame comprises a main frame portion and an articulating frame portion, wherein the rear wheel is rotatably coupled to the articulating frame portion.

According to some aspects, an adjustable head angle bicycle assembly comprises: a steerer tube that extends along a longitudinal axis; a head tube comprising an upper end, a lower end, and an inner wall, the head tube further comprising a first annular surface protruding radially inward from the inner wall at the upper end, and a second annular surface protruding radially inward from the inner wall at the lower end; an upper cup comprising a third annular surface engaged with the first annular surface of the head tube, the upper cup further comprising an inner surface that controls a lateral position of an upper portion of the steerer tube with respect to the upper end of the head tube; and a lower cup comprising a fourth annular surface engaged with the second annular surface of the head tube, the lower cup further comprising an inner surface that controls a lateral position of a lower portion of the steerer tube with respect to the lower end of the head tube.

In some aspects, the first, second, third, and fourth annular surfaces each comprise a curved surface. In some aspects, the first, second, third, and fourth annular surfaces each comprise a spherical radius of curvature. In some aspects, the inner surface of at least one of the upper cup or the lower cup defines a first axis that is not collinear with a second axis defined by the annular surface of the at least one of the upper cup or the lower cup. In some aspects, the first axis is parallel to the second axis. In some aspects, the first axis is not parallel to the second axis. In some aspects, the at least one of the upper cup or the lower cup comprises a shape that fits into the upper or lower end of the head tube in at least two different orientations, and that resists rotation of the at least one of the upper cup or the lower cup with respect to the head tube when fitted into the upper or lower end of the head tube in the at least two different orientations. In some aspects, the inner surfaces of the upper cup and the lower cup control the lateral positions of the upper portion and lower portion of the steerer tube, respectively, by constraining the positions of bearings that engage the steerer tube.

According to some aspects, a method of adjusting a bicycle head angle comprises: providing a bicycle assembly comprising: a steerer tube that extends along a longitudinal axis; a head tube comprising an upper end, a lower end, and an inner wall, the head tube further comprising a first annular surface protruding radially inward from the inner wall at the upper end, and a second annular surface protruding radially inward from the inner wall at the lower end; an upper cup comprising a third annular surface engaged with the first annular surface of the head tube, the upper cup further comprising an inner surface that controls a lateral position of an upper portion of the steerer tube with respect to the upper end of the head tube, wherein the inner surface is offset laterally in a first direction from the third annular surface; and a lower cup comprising a fourth annular surface engaged with the second annular surface of the head tube, the lower cup further comprising an inner surface that controls a lateral position of a lower portion of the steerer tube with respect to the lower end of the head tube; removing the upper cup; and replacing the upper cup in an orientation that is rotated 180 degrees about the longitudinal axis, causing the inner surface of the upper cup to be offset in a second direction opposite the first direction.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting.

DETAILED DESCRIPTION

Figure 1:
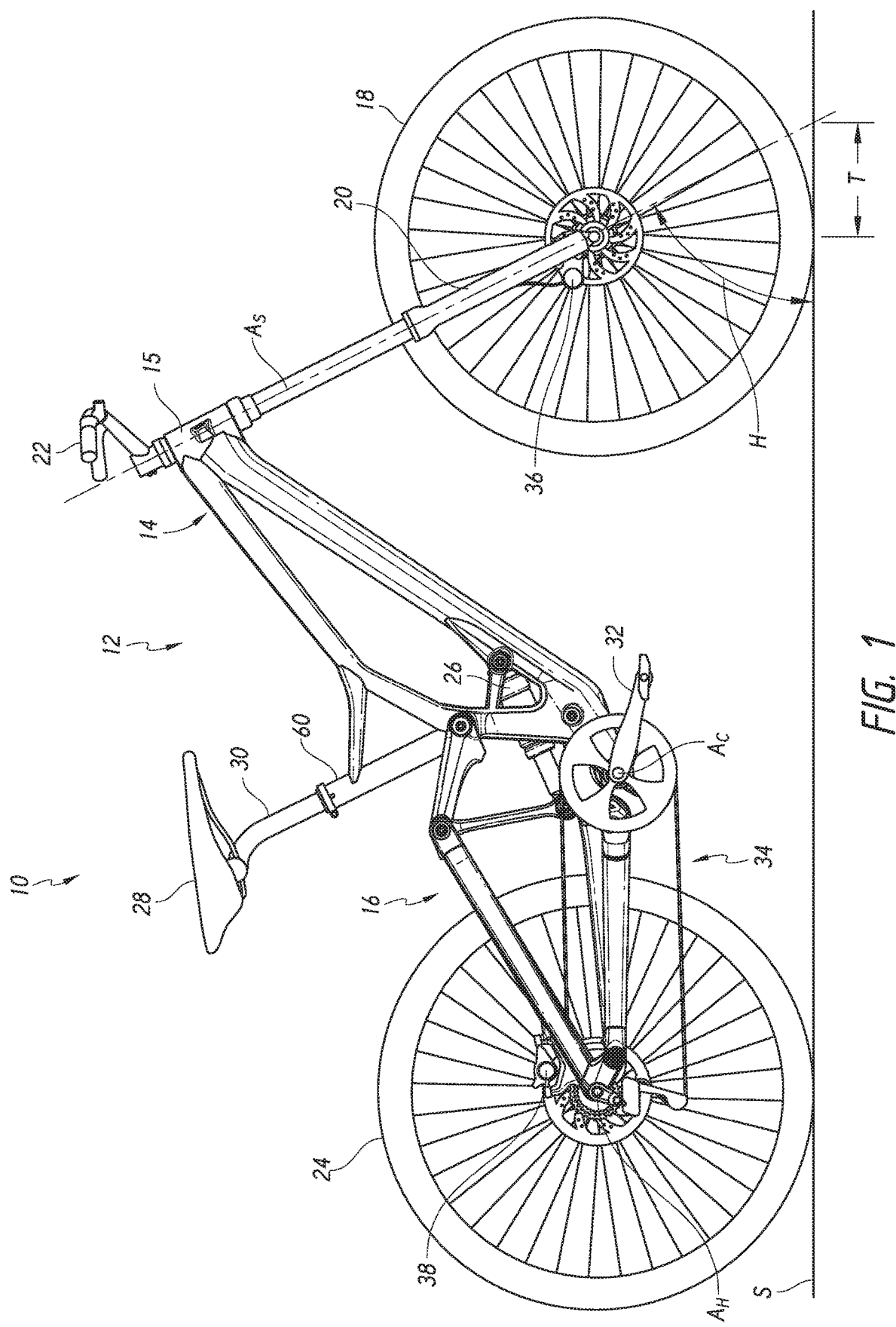
FIG. 1 is a side elevational view of an aspect of an off-road bicycle, or mountain bike, which can incorporate certain features, aspects and advantages of the present technology.

In the following detailed description, reference is made to the accompanying drawings, which form a part of the present disclosure. The illustrative aspects described in the detailed description, drawings, and claims are not meant to be limiting. Other aspects may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention. Descriptions of unnecessary parts or elements may be omitted for clarity and conciseness, and like reference numerals refer to like elements throughout.

The disclosure herein presents various aspects of bicycle assemblies, including adjustable headset assemblies, which enable a rider to easily tailor a bicycle's geometry, specifically the bicycle's head angle, to their preference for a particular riding terrain. A bicycle's head angle is defined as the angle of the bicycle's steering axis measured from horizontal when the bicycle is resting on a horizontal surface. Specifically, the head angle is an acute angle that is measured from the portion of the steering axis that extends above the horizontal surface, to the portion of the horizontal surface that is rearward of the point where the steering axis intersects the horizontal surface. Adjusting the head angle can provide various benefits. For example, a slacker (e.g., smaller) head angle may be desirable when riding an off-road bicycle down steep terrain, such as to reduce the tendency of the bicycle to pitch forward. As another example, a steeper (e.g., larger) head angle may be desirable when riding a bicycle on less steep terrain or flat terrain, such as to increase steering response and reduce understeer.

Various aspects of adjustable head angle systems disclosed herein exhibit various benefits. For example, some aspects are easy to adjust in the field using no tools or minimal tools, such as a screwdriver, hex key, star driver, or the like. As another example, some aspects enable adjustment of the head angle without removing the steerer tube from the head tube. As another example, some aspects are designed to be lightweight. For example, some aspects utilize a head tube that is specifically designed to work with adjustable upper and/or lower cups, thus requiring less hardware and/or less bulky hardware than if the system were designed to be universal (e.g., to work with a standard head tube).

The above referenced benefits, and various other benefits discussed herein, are achieved through various features. For example, in some aspects, an adjustable headset assembly comprises an upper cup and a lower cup that each interface with the head tube at an outer surface, and with a bearing that guides the steerer tube at an inner surface. One or both of the cups may be designed such that the alignment of the bearing with respect to the head tube is adjustable by, for example, rotating the cup, removing and reinserting the cup in a different orientation, removing the cup and replacing the cup with a different cup, and/or the like. Desirably, the upper cup is user-adjustable (and/or replaceable) to control the head angle, and the lower cup follows or conforms to the head angle set by the upper cup without the lower cup needing to be removed, adjusted, replaced, and/or the like. In such an aspect, the upper cup may be referred to as a control cup or guide cup, and the lower cup may be referred to as a subordinate cup. Such a configuration can be desirable, for example, because it can enable relatively easy adjustment of the head angle in the field by merely adjusting the upper cup without having to disassemble the rest of the headset assembly (such as by removing the steer tube from the head tube). Such a configuration is not intended to be limiting, however, and in some aspects the lower cup may comprise a guide cup, with the upper cup being a subordinate cup, or other aspects may allow or require adjustment and/or replacement of both the upper cup and the lower cup to change the head angle.

Another feature of some aspects disclosed herein is that an adjustable headset assembly may comprise upper and lower cups, with one or both of them being insertable into the head tube, rotatable with respect to the head tube, and/or removable from the head tube without requiring tools, or with only requiring a minimal amount of tools, such as a screwdriver, hex key, star driver, or the like. For example, some headset assemblies may be designed to have cups that are press-fit into the head tube. Such a configuration is not easily adjusted, particularly in the field, because specialized tools are needed to remove and replace a press-fit component. Various aspects of cups disclosed herein, however, can be inserted into and removed from the head tube by hand, without requiring specialized tools. For example, instead of locating the cups with respect to the head tube by press-fitting two cylindrical surfaces together, the cups of some aspects disclosed herein comprise a curved or tapered surface that mates with a corresponding curved or tapered surface of the head tube. In some aspects, the curved or tapered surfaces comprise a spherical radius, but a spherical radius is not necessarily required. Such configurations using curved or tapered surfaces can enable the cups to be easily positioned into place by hand, but still solidly retained in place with respect to the head tube once a compressive force has been applied to retain the cups against the head tube, such as by tightening a bolt, locknut, and/or the like using a screwdriver, wrench, hex key, star driver, and/or the like.

Example Bicycle

FIG. 1 illustrates one aspect of an off-road bicycle, or mountain bike 10, which may utilize head angle adjustment techniques disclosed herein. Although a mountain bike is illustrated, the techniques disclosed herein are not limited to off-road uses, and may be used with any bicycle, including road bikes. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. The above-described coordinate system is provided for the convenience of describing the aspect illustrated in the figures, and is not intended to limit the scope of the present disclosure unless expressly indicated.

The bicycle 10 includes a frame assembly 12 comprising a main frame 14 and an articulating frame, or subframe 16, pivotally supported relative to the main frame 14. The bicycle 10 also includes a front wheel 18 carried by a front suspension assembly, or suspension fork 20. A steerer tube (not shown, see element 250 of FIG. 2) extending from an upper end of the fork 20 is positioned within an internal cavity of head tube 15 and rotatably coupled to the head tube 15 about steering axis $A_S$. A handlebar assembly 22 is connected to an upper end of the steerer tube and is operable to permit a rider of the bicycle 10 to rotate the front wheel 18 about the steering axis $A_S$.

FIG. 1 further illustrates two dimensions that are dictated at least partially by the position of the steering axis $A_S$. Specifically, the head angle is indicated by dimension H, which is the angle of the steering axis $A_S$ with respect to horizontal surface S. Ground trail, sometimes referred to merely as trail, is also indicated by dimension T. Ground trail is the horizontal measurement from the point where the front wheel 18 contacts the horizontal surface S to the point where the steering axis $A_S$ intersects the horizontal surface S. Ground trail is related to head angle, because changing the head angle will cause a corresponding change to ground trail, assuming other parameters remain the same. In general, a larger ground trail provides more stable steering. The head angle H and trail T can desirably be adjusted by altering the orientation of the steering axis $A_S$ with respect to the head tube 15. Various aspects described below illustrate features that may be used to accomplish such adjustment.

A rear wheel 24 of the bicycle 10 is carried by the subframe 16. A shock absorber 26 is pivotally connected to both the main frame 14 and the subframe 16 to provide resistance to articulating motion of the subframe 16 relative to the main frame 14 and, thus, provide resistance to the suspension travel of the rear wheel 24. A seat assembly 28 is supported above the bicycle frame 12 at a position behind the handlebar assembly 22 and provides support for a rider of the bicycle 10.

A pedal crank assembly 32 is rotatably supported by the bicycle frame 12 and drives a multi-speed chain drive arrangement 34. The bicycle 10 also includes front and rear brake systems 36, 38 for slowing and stopping the bicycle 10. Although the illustrated brakes 36, 38 are disc-type brakes, other suitable brake systems may also be used, such as rim-type brakes for example. Rider controls (not shown) are typically provided on the handlebar assembly 22 and are operable to control shifting of the multi-speed chain drive arrangement 34 and front and rear brake systems 36, 38.

Example Adjustable Headset Assembly

Figure 2:
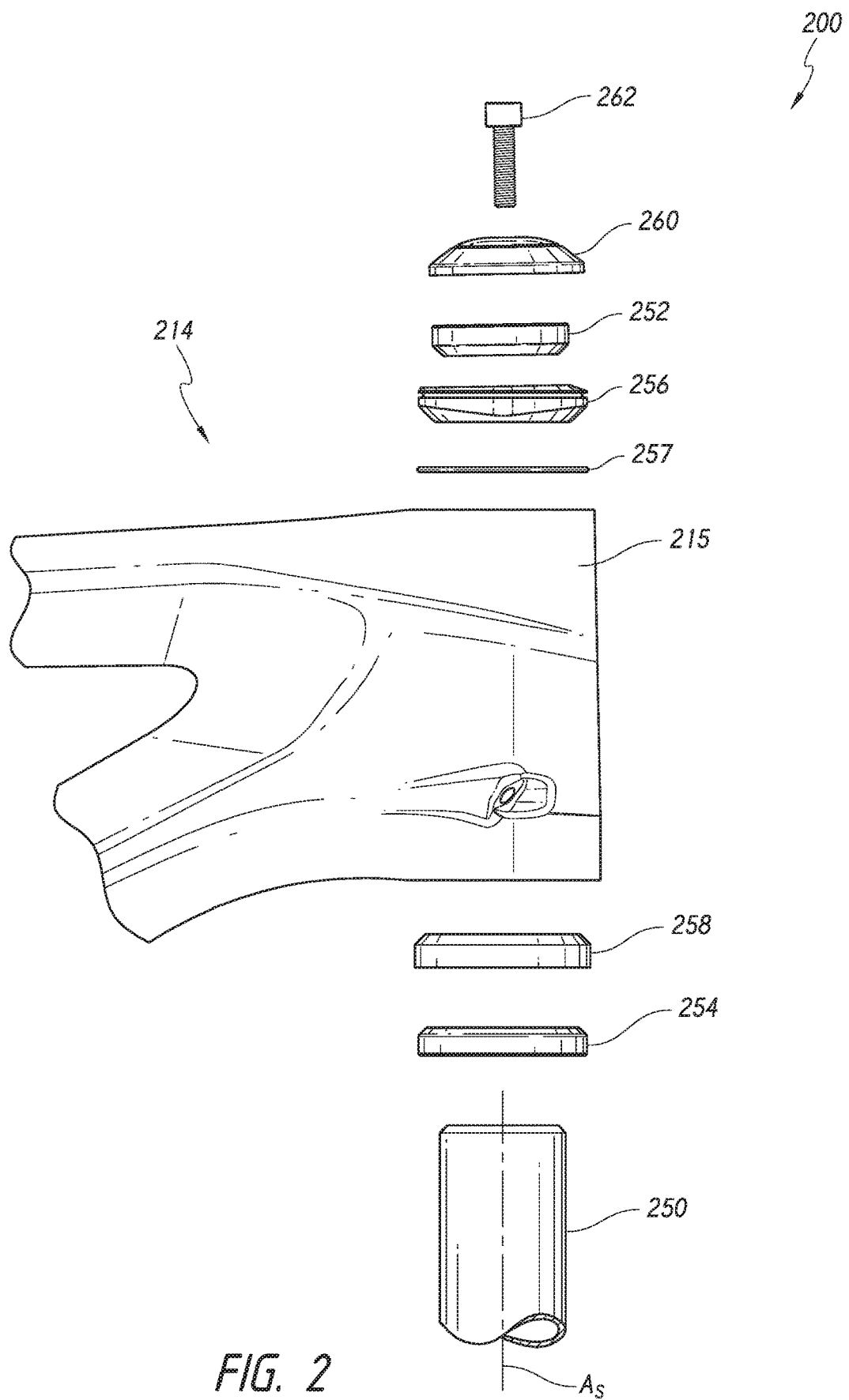
FIG. 2 is an exploded view of certain components of an aspect of an adjustable headset assembly.

FIG. 2 illustrates an exploded view of certain components of an adjustable headset assembly 200 as disclosed herein. The adjustable headset assembly 200 may be used with the bicycle 10 of FIG. 1, or with various other bicycles. For clarity, only certain components related to the adjustable nature of the headset are shown. The adjustable headset assembly 200 comprises a steerer tube 250 that can be inserted into a head tube 215. The head tube 215 may be part of a bicycle frame 214, which may be similar in design to the frame 14 of FIG. 1. The steerer tube 250 may, for example, be connected to the suspension fork 20 of FIG. 1.

A longitudinal axis of the steerer tube 250 defines the steering axis $A_S$ (see FIG. 1). In a bicycle assembly that does not utilize an adjustable headset assembly, the longitudinal axis of the steerer tube 250 may be designed to be collinear with a longitudinal axis of the head tube (e.g., a longitudinal axis defined by a cylindrical inner surface of a head tube). In various aspects disclosed herein, however, where the head angle of the bicycle is adjustable, the longitudinal axis of the steerer tube 250 may not always be collinear with a longitudinal axis of the head tube 215.

With continued reference to FIG. 2, the relative positioning or orientation of the steerer tube 250 with respect to the head tube 215 is desirably controlled by an assembly of components that includes upper and lower (or top and bottom) bearings 252, 254 and upper and lower (or top and bottom) cups 256, 258. The upper and lower cups 256, 258 preferably engage and are positioned by the head tube 215, the upper and lower bearings 252, 254 preferably engage and are positioned by the upper and lower cups 256, 258, respectively, and the steerer tube 250 preferably engages and is positioned by the upper and lower bearings 252, 254. With such an assembly, changing the positioning or orientation of one or more of the cups 256, 258 and/or one or more of the bearings 252, 254 can desirably alter the orientation of the steering axis $A_S$ with respect to the head tube 215, thus altering the overall head angle of the bicycle (e.g., angle H of FIG. 1). Further details of how these various components fit together, and how they can be adjusted to adjust the head angle H, are discussed below with reference to additional figures.

FIG. 2 also illustrates a gasket 257. The gasket 257 may, for example, comprise an O-ring that fits into a groove of the upper cup 256 (see groove 259 show in FIG. 3A) and engages an inner surface of the head tube 215. The gasket 257 may be desirable, for example, to help retain the upper cup 256 within the head tube 215, to limit the introduction of foreign matter, such as dust, debris, and/or the like into the interior cavity of the head tube 215, and/or the like. Some aspects may utilize a gasket for both cups 256, 258, some aspects may utilize a gasket for the lower cup 258 but not the upper cup 256, and some aspects may not utilize a gasket.

An adjustable headset assembly as disclosed herein may be held together in various ways. The aspect shown in FIG. 2 preferably utilizes a cap 260 that fits over the upper bearing 252 (either directly over the bearing or over a handlebar stem, not shown, which is positioned over the bearing) and is held in place with a bolt 262 that extends downward into an interior cavity of the steerer tube 250. The bolt 262 may retain the assembly in various ways, such as by engaging a thread inside the steerer tube 250, engaging an expandable assembly that expands against an interior surface of the steerer tube 250, and/or the like. The bolt 262 may comprise a head that is configured to enable a rider in the field to easily remove and/or reinsert the bolt using no tools or an easily carried tool, such as a screwdriver, hex key, star driver, or the like. For example, some aspects may comprise a hex head, a Phillips head, and/or the like. As another example, some aspects may comprise a bolt head that is configured to be tightened and loosened by a user's hand without using tools, such as by including a knurled or other grip surface. In some aspects, the assembly may be held together using alternative methods, such as, for example, a lock nut that is positioned above the top bearing 252 and/or the cap 260 and engages a thread of the steerer tube 250.

Figure 3A:
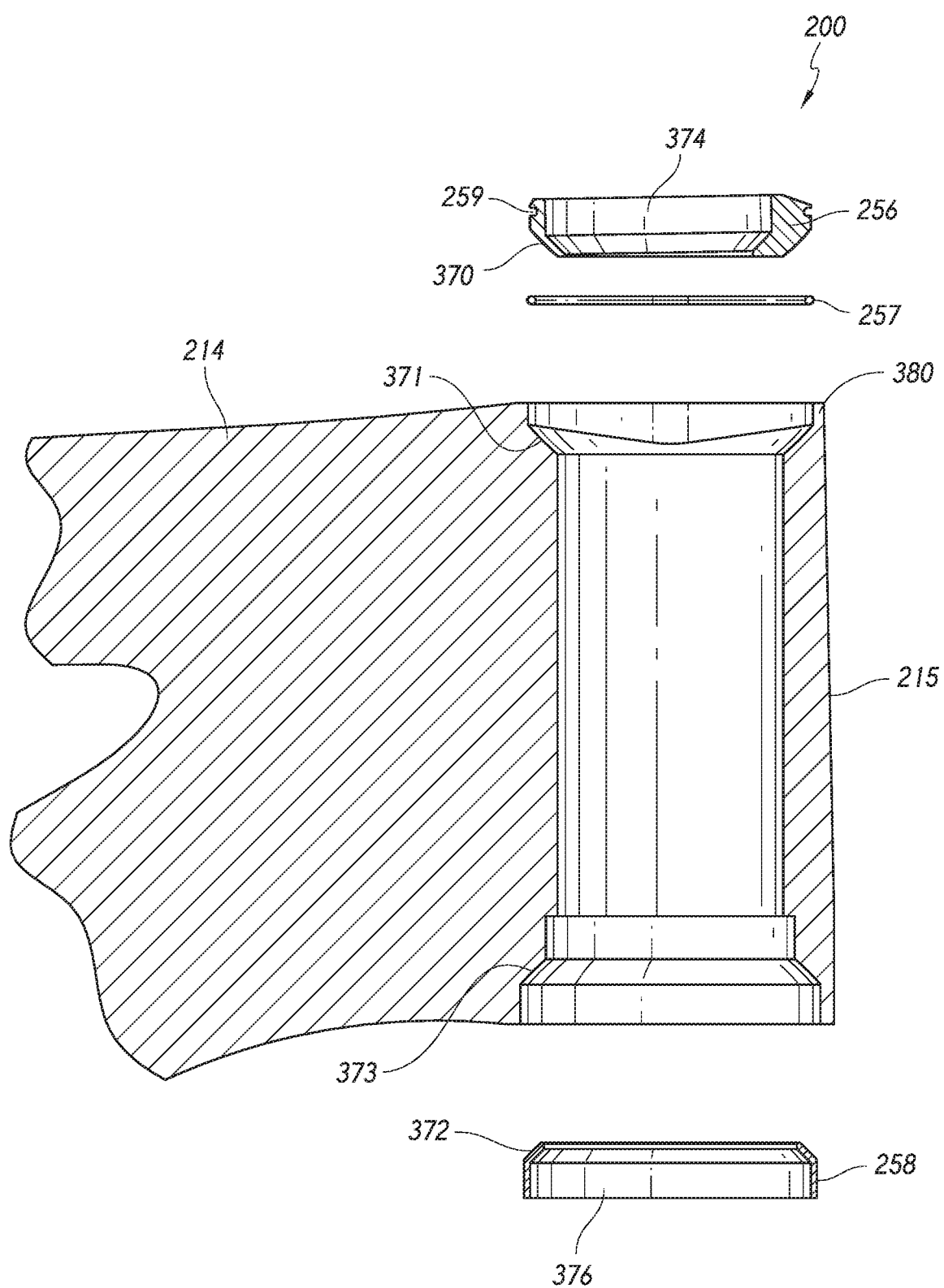
FIG. 3A is an exploded cross-sectional view of certain components of the adjustable headset assembly of FIG. 2.
Figure 3B:
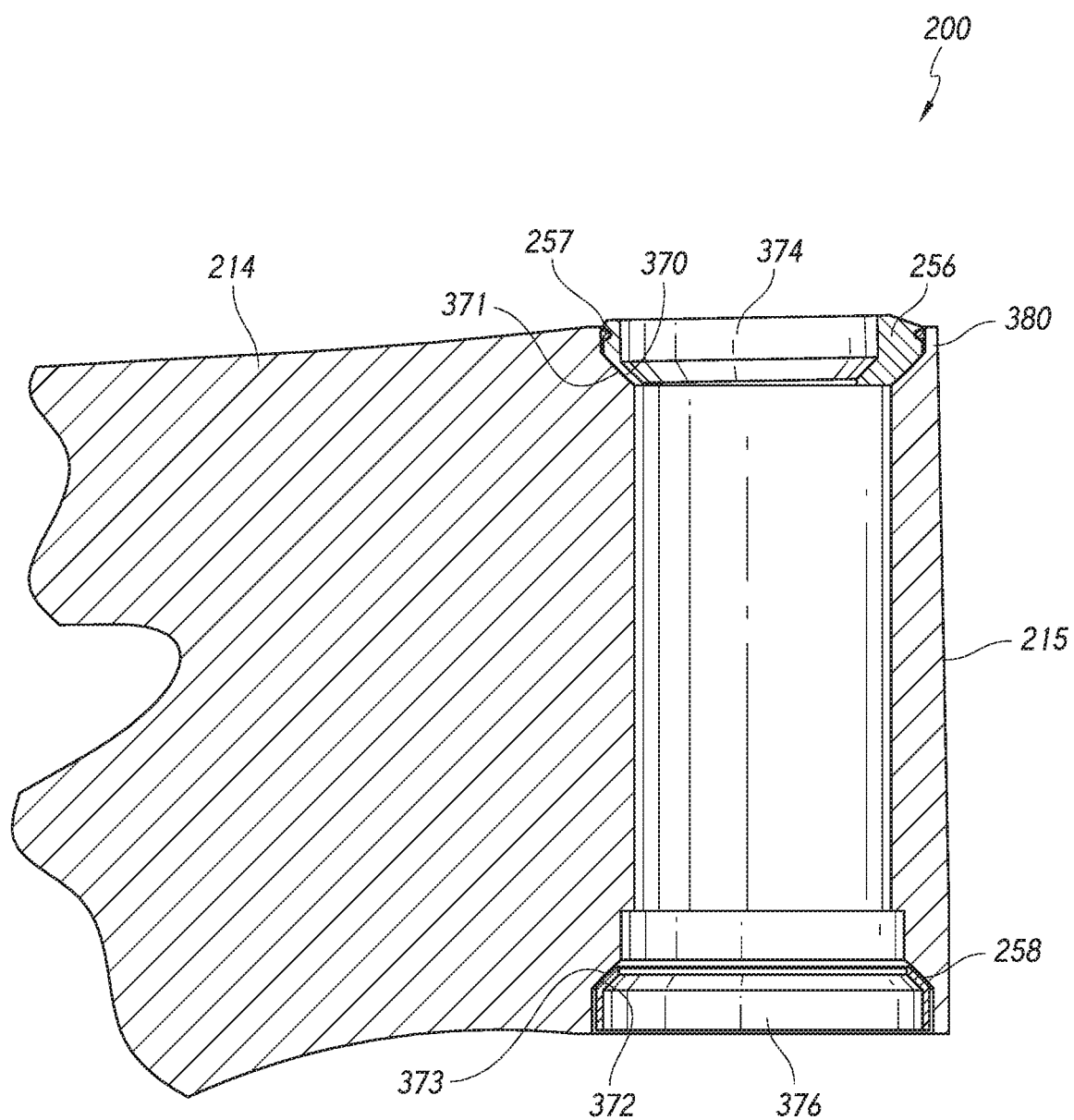
FIG. 3B is an assembled cross-sectional view of certain components of the adjustable headset assembly of FIG. 2.
Figure 3C:
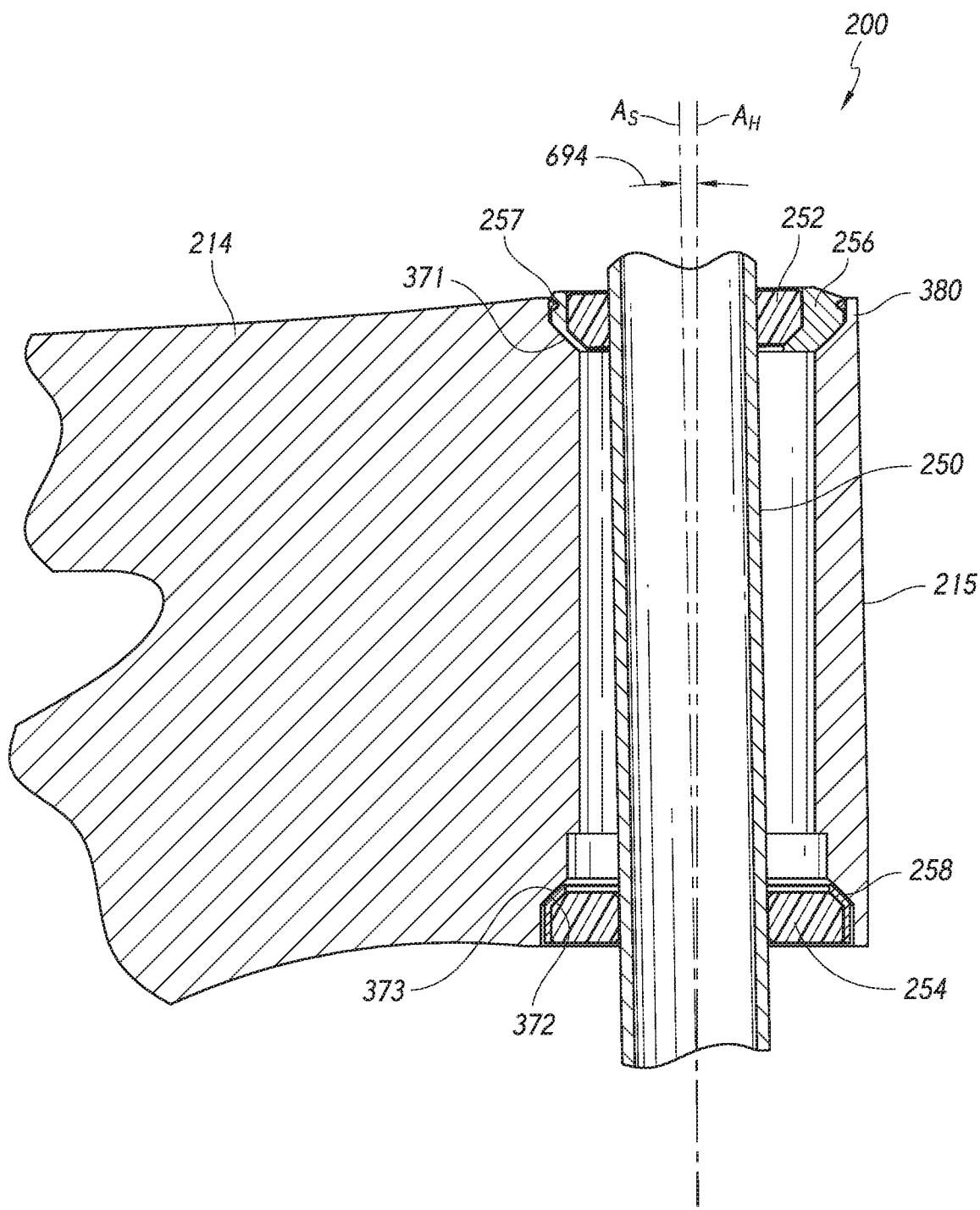
FIG. 3C is another assembled cross-sectional view of certain components of the adjustable headset assembly of FIG. 2.

Turning to FIGS. 3A-3C, FIGS. 3A-3C illustrate cross-sectional views of certain components of the adjustable headset assembly 200 of FIG. 2. FIG. 3A illustrates an exploded cross-sectional view showing the head tube 215, upper and lower cups 256, 258, and gasket 257. FIGS. 3B and 3C illustrates the same components as FIG. 3A, except in an assembled configuration. For clarity in describing the fit and function of various components of the assembly, some components of the adjustable headset assembly 200 shown in FIG. 2 are not shown in FIGS. 3A, 3B, and 3C.

The upper and lower cups 256, 258 each comprise an annular shape and comprise an inner surface 374, 376 that is configured to engage an outer race of a bearing, such as bearings 252, 254 of FIG. 2. In this aspect, the inner surfaces 374, 376 are desirably cylindrical surfaces that engage a cylindrical outer surface of an outer race of bearings 252, 254. Other aspects may use different configurations for positioning the bearings with respect to the cups, however. Further, in some aspects, the upper and/or lower cups 256, 258 may form the outer race of the bearings 252, 254, with, for example, a ring of ball bearings guided by a cage directly contacting inner surfaces of the upper and/or lower cups 256, 258, instead of the outer race of the bearings being a separate component that engages the upper and/or lower cups 256, 258. Although various portions of the present disclosure describes the cups 256, 258 as positioning the bearings 252, 254, it is considered part of the present disclosure that any such descriptions may encompass alternative aspects where the cups 256 and/or 258 may form part of the bearing instead of merely positioning a bearing that is separate from the cups.

In some headset assemblies, upper and lower cups may be utilized that comprise a cylindrical outer surface that engages a cylindrical inner surface of a head tube, such as by using a press fit between the cups and the head tube. Various aspects of the present disclosure, however, preferably use a different type of engagement between the cups 256, 258 and head tube 215, which allows one or both of the cups to be repositioned with respect to the head tube 215, thus allowing the orientation of the steering axis with respect to the head tube 215 to be adjusted.

As a specific example, the aspect illustrated in FIG. 3A uses curved surfaces 370, 371, 372, and 373 to control the positioning of the upper and lower cups 256, 258 with respect to the head tube 215. The head tube 215 comprises curved surfaces 371, 373 that extend radially inward from an inner wall 380 of the head tube 215 and may have a generally concave shape. The upper and lower cups 256, 258 comprise corresponding curved surfaces 370, 372, which may be generally convex. In this aspect, the curved surface 371 of the head tube 215 is generally upward facing to engage generally downward facing curved surface 370 of the upper cup 256. Further, the curved surface 373 of the head tube 215 is generally downward facing to engage generally upward facing curved surface 372 of the lower cup 258. Preferably, the curved surfaces each comprise a spherical radius that allows the upper and lower cups 256, 258 to rotate forward and rearward (e.g., clockwise and counter-clockwise with reference to the orientation of FIG. 3A) with respect to the head tube 215. Other aspects may utilize different configurations, however, such as curved surfaces that are not spherical, cylindrical surfaces, a gimbal type arrangement, and/or the like. In a preferred aspect, the curved surfaces 371, 373 are integral to the head tube 215, and the curved surfaces 370, 372 of the cups 256, 258 directly contact the head tube 215 through curved surfaces 371, 373. Such a configuration can be desirable, for example, to reduce weight, increase manufacturability, increase rigidity, and/or to make the assembly easier to assemble. The present disclosure is not limited to such an aspect, however, and some aspects may have the curved surfaces 371 and/or 373 be part of a separate component that is assembled to the head tube 215.

As further discussed below, the aspect illustrated in FIGS. 3A-3C utilizes a control cup or guide cup for the upper cup 256 and a subordinate cup for the lower cup 258. Stated another way, the upper cup 256 can be reoriented by the user (or replaced with a different cup) to set or establish a specific head angle, and the lower cup 258 is configured to conform to that head angle without requiring a specific adjustment to the lower cup by the user. For example, as can be seen in FIG. 3A, the inner surface 374 of the upper cup 256 is offset toward the rear of the upper cup 256. Assembling the assembly with the upper cup 256 in this position (as shown in FIG. 3B) will desirably result in a slacker or smaller head angle. FIG. 3C illustrates the steering axis $A_S$ (represented here by a longitudinal axis of the steerer tube 250) having been tilted back by angle 694 with respect to a longitudinal axis of the head tube $A_H$, as a result of the upper cup 256 being assembled in the position shown in FIG. 3B. Such a configuration will desirably result in a slacker or smaller head angle. In this aspect, angle 694 may be approximately 1°; however, other aspects may shift the steering axis by a different amount.

If the upper cup 256 is rotated 180° about the head tube axis $A_H$, however, the inner surface 374 will be offset toward the front of the upper cup 256. Assembling the assembly with the upper cup 256 in such a position will desirably result in a steeper or larger head angle (e.g., in this aspect, approximately 1° in the opposite direction of the configuration of FIG. 3C). In either configuration of the upper cup 256, the lower cup 258 is desirably configured such that it can conform to the head angle set by the upper cup 256. Specifically, when the upper cup's inner surface 374 is shifted rearward, the lower cup 258 desirably rotates rearward or counterclockwise. When the upper cup's inner surface 374 is shifted forward, the lower cup 258 desirably rotates forward or clockwise. The upper cup 256 may also rotate rearward or forward depending on the desired adjustment to the head angle.

In the aspect illustrated in FIGS. 3A-3C, the range of adjustability of the head angle (e.g., angle H of FIG. 1) is desirably approximately 2° (plus or minus 1°). The resulting range of adjustability of the bicycle's wheelbase or ground trail (e.g., dimension T of FIG. 1) may be desirably approximately 40 mm (plus or minus 20 mm). It should be noted that other geometry parameters also affect wheelbase or ground trail, and thus the same range of head angle adjustability may result in a different range of wheelbase or ground trail adjustability in different bicycles.

A head angle adjustment range of approximately 2° may seem relatively small to one unskilled in the art of bicycle frame design, but such an adjustment range can have a significant effect on a bicycle's handling characteristics. As an example, two types of mountain bike frames that have drastically different handling characteristics are a downhill mountain bike and a cross country race mountain bike. A downhill mountain bike is intended to be ridden down steep inclines and accordingly has a relatively low steering angle to help avoid pitching forward during steep descents. For example, such a downhill mountain bike may have a steering angle of 63°. At another extreme is a cross country race mountain bike that is intended to be ridden in rough terrain but not necessarily focused on riding downhill. Such a cross country race mountain bike may, for example, have a steering angle of 67.5°. Although the difference in head angles between these two extremes is only 4.5°, such difference can drastically change the handling characteristics of the bicycles. Returning to the aspect of FIGS. 3A-3C, an angle adjustment range of 2° is almost half of the angular range between the two above described extremes, and can accordingly enable a rider to significantly affect the handling characteristics of his or her bicycle.

As noted elsewhere herein, although this aspect is described as having a range of adjustability of 2°, other aspects may be designed with a greater or lesser range of adjustability. Further, some aspects may be designed to accomplish a particular amount of wheelbase change, such as a total range of wheelbase adjustability of at least 10 mm, at least 20 mm, at least 30 mm, at least 40 mm, at least 50 mm, at least 60 mm, or more.

Adjustable Headset Schematic Diagrams

Figure 6B:
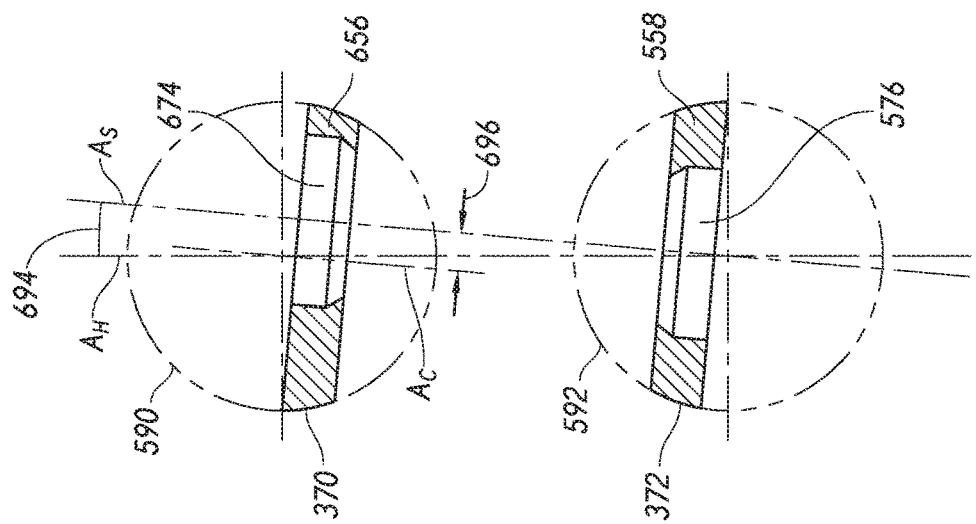
FIGS. 6A and 6B are schematic diagrams illustrating certain features of another aspect of an upper cup and a lower cup of an adjustable headset assembly.
Figure 6A:
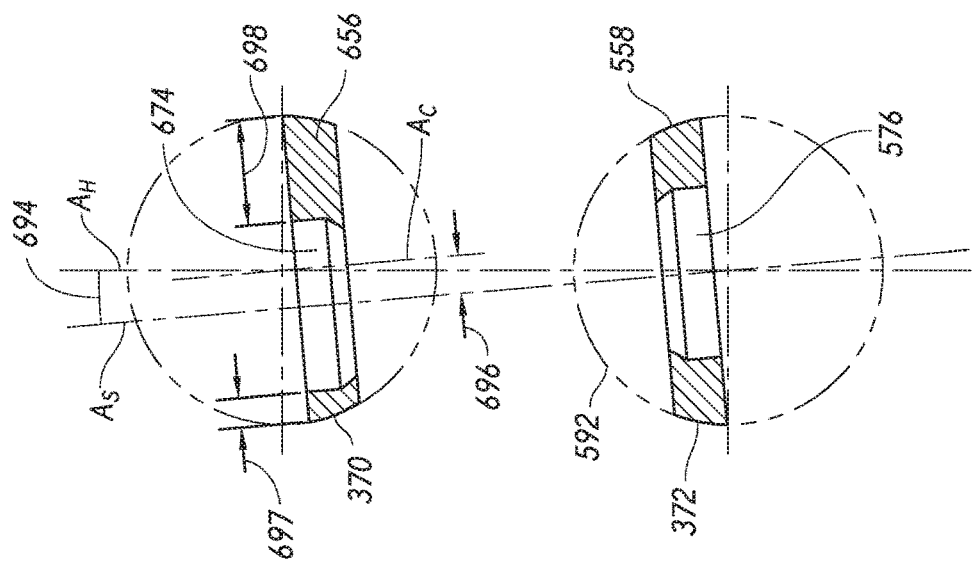
Figure 5:
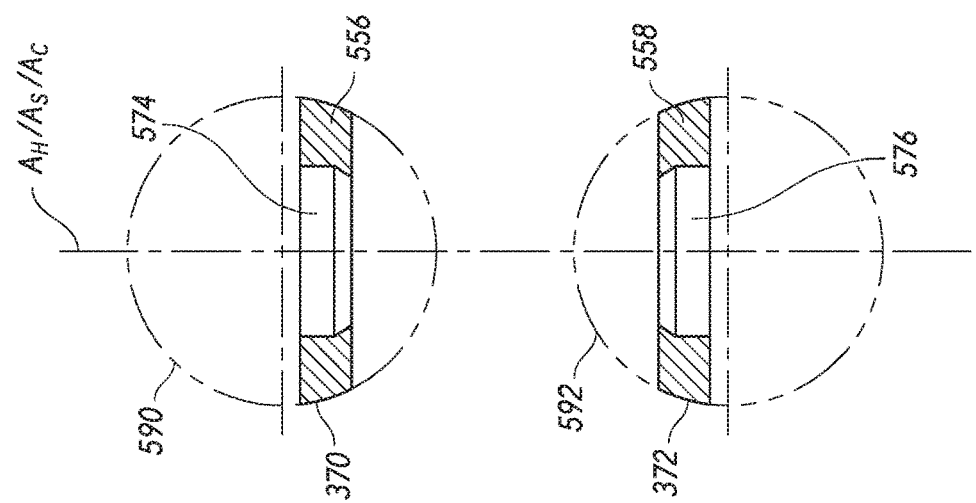
FIG. 5 is a schematic diagram illustrating certain features of an aspect of an upper cup and a lower cup of an adjustable headset assembly.

FIGS. 5, 6A, and 6B are schematic diagrams illustrating certain features of example aspects of upper and lower cups for use in adjustable headset assemblies as disclosed herein. The diagrams are shown as cross-sectional views, taken along the same direction and section plane as FIGS. 3A-3C (e.g., sectioned along a vertical, central plane generally bisecting the bicycle). The diagrams are oriented such that the right side of the page is generally forward, and the left side of the page is generally rearward. The diagrams illustrated in these figures are simplified, not to scale, and have certain dimensions exaggerated to more easily illustrate the concepts disclosed herein. The concepts illustrated in these diagrams and discussed below may be utilized with any of the aspects disclosed herein.

Each of the three schematic diagrams of FIGS. 5, 6A, and 6B illustrates three axes, specifically a head tube axis $A_H$, a steering axis $A_S$, and an upper cup axis $A_C$. The head tube axis $A_H$ is representative of a longitudinal axis of a head tube, such as the axes $A_H$ illustrated in FIGS. 4B, 4D, and 4F. For simplicity, each of the diagrams is oriented such that the head tube axis $A_H$ is in a vertical orientation. In use, however, the head tube axis $A_H$ will typically not be oriented vertically when the bicycle is resting on a horizontal surface. The steering axis $A_S$ is representative of a longitudinal axis of a steerer tube, such as steering axis $A_S$ illustrated in FIGS. 1 and 2. The positioning of the steering axis $A_S$ being defined by inner surfaces 574, 576, and 674, which locate bearings, such as bearings 252 and 254 shown in FIG. 2. The upper cup axis $A_C$ is representative of a central axis defined by the outer surface 370 of the upper cup. In FIG. 5, all three axes $A_H$, $A_S$, and $A_C$ are collinear. FIGS. 6A and 6B, however, illustrate configurations where the three axes are not collinear.

In each of the three diagrams, an upper circle 590 is representative of the spherical radius of curved surface 371 of the head tube (see FIG. 3A), and a lower circle 592 is representative of the spherical radius of curved surface 373 of the head tube (see FIG. 3A). The outer curved surface 370 of upper cups 556 and 656 also desirably comprise a spherical radius that is complementary to the curved surface 371 of the head tube such that the outer curved surface 370 can be nested within the inner curved surface 371. Similarly, the outer curved surface 372 of lower cup 558 also desirably comprises a spherical radius that is complementary to the curved surface 373 of the head tube such that the outer curved surface 372 can be nested within the inner curved surface 373.

Various radii of curvature, spherical or otherwise, may be used with the aspects disclosed herein. For example, in one aspect, the upper curved surfaces 370, 371 comprise a radius of curvature of approximately 33.6 mm, and the lower curved surfaces 372, 373 comprise a radius of curvature of approximately 36.25 mm. Such a configuration may be desirable, for example, when using a 1.5 inch bearing for the lower bearing 254. If a larger lower bearing is used, such as a 2 inch bearing, it may be more desirable to increase the radius of curvature of the lower curved surfaces 372, 373 to be approximately 48.33 mm. In some aspects, the radii of curvature of the curved surfaces 370, 371, 372, 373 may be within a range of 30 to 40 mm, 25 to 40 mm, 22 to 60 mm, 40 to 50 mm, 30 to 50 mm, or the like. Any of these values or ranges of values may be used with a radius of curvature that is spherical or with a non-spherical radius of curvature, such as a generally cylindrical radius that is oriented to allow the upper and/or lower cups to rotate in the forward and backward direction but not in other directions. It should also be noted that specific numbers given above are approximate, and in some aspects the concave curved surfaces 371, 373 may comprise a slightly larger radius of curvature than the convex curved surfaces 370, 372, to account for manufacturing tolerances and/or to avoid binding.

The diagrams shown in FIGS. 5, 6A, and 6B illustrate an aspect wherein multiple interchangeable upper cups 556, 656 are used, while the same lower cup 558 is used with either of the interchangeable upper cups. In this aspect, the upper cup 556 or 656 is a control cup that dictates the head angle of the bicycle, while the lower cup 558 is a subordinate cup that follows or conforms to the head angle dictated by the upper cup. As discussed above, other aspects may flip this arrangement, using the lower cup as a control cup and the upper cup as a subordinate cup, or other aspects may use both cups as control cups, requiring both the upper and lower cups to be replaced and/or reoriented with respect to the head tube to change the head angle.

Turning to FIG. 5, the upper cup 556 of FIG. 5 utilizes an inner surface 574 that is desirably centered with respect to the outer surface 370. Further, the inner surface 576 of the lower cup 558 is desirably centered with respect to the outer surface 372 of lower cup 558. Since the upper and lower curved surfaces of the head tube (e.g., surfaces 371 and 373 of FIG. 3A, represented by circles 590 and 592, respectively) are preferably aligned with one another along the head tube axis $A_H$, the upper and lower cups 556, 558 of FIG. 5 desirably lead to a situation wherein the steering axis $A_S$, upper cup axis AC, and head tube axis $A_H$ are collinear.

The configuration shown in FIG. 5 may, for example, be a normal or default configuration of a bicycle, with the steering axis $A_S$ being collinear with the head tube axis $A_H$. If a user wishes to adjust to the head angle, however, one way to do so is to replace the upper cup 556 with the upper cup 656 shown in FIGS. 6A and 6B. The upper cup 656 is similar to upper cup 556, except the inner surface 674 has been shifted or offset from the upper cup's axis $A_C$ by dimension 696. With the inner surface 674 being offset from the upper cup's axis $A_C$, the upper cup 656 may be installed into the head tube in at least two different orientations, specifically, an orientation where the inner surface 674 is shifted rearward (as shown in FIG. 6A) or an orientation where the inner surface 674 is shifted forward (as shown in FIG. 6B).

With reference to FIG. 6A, the upper cup 656 has been installed in an orientation where the inner surface 674 is shifted rearward. When installing the bearings and steerer tube, preferably the upper cup 656 and lower cup 558 will both rotate rearward or counterclockwise in order to keep the longitudinal axes of the inner surfaces 674, 576 in alignment. This will result in the steering axis $A_S$ also rotating rearward or counterclockwise with respect to the head tube axis $A_H$ by angle 694. The end result would be a head angle (e.g., angle H shown in FIG. 1) that has been slackened or reduced by an amount equal to angle 694. Desirably, when adjusting the head angle, the mating curved surfaces 370, 371 and 372, 373 (see FIG. 3A) are allowed to slide against one another when the cups are rotated (e.g., to put them into the positions shown in FIGS. 5, 6A, and 6B). When the desired head angle has been set, however, a force is desirably applied that compresses the upper and lower cups against the head tube with sufficient force to "lock" the curved surfaces together (e.g., a force that increases the friction between the mating curved surfaces). Such force may be applied by, for example, the bolt 262 of FIG. 2, a locknut, and/or the like.

With reference to FIG. 6B, this diagram illustrates a similar configuration as FIG. 6A, except the upper cup 656 has been rotated 180° about the head tube axis $A_H$, leading to the inner surface 674 being offset forward, and the steering axis $A_S$ being rotated forward or clockwise by angle 694 instead of counterclockwise. Such a configuration would lead to the head angle (angle H of FIG. 1) steepening or increasing by an amount equal to angle 694.

In the schematic diagrams of FIGS. 6A and 6B, angle 694 is approximately 5°, representing a total adjustment range of 10° (plus or minus 5°). This angle is exaggerated, however, to more clearly illustrate the disclosed functionality, and some aspects may preferably be designed to exhibit a smaller range of adjustability. For example, some aspects may comprise a total adjustment range of approximately 2° (plus or minus 1°). Other aspects may comprise a total adjustment range of approximately 8° (plus or minus 4°). Some aspects may comprise a total adjustment range that is within a range of 1 to 3°, 2 to 4°, 3 to 5°, 4 to 6°, 5 to 7°, or 6 to 8°. Some aspects may comprise a total adjustment range that is at least 1°, at least 1.5°, at least 2°, at least 2.5°, at least 3°, at least 3.5°, at least 4°, at least 4.5°, at least 5°, at least 5.5°, at least 6°, at least 6.5°, at least 7°, at least 7.5°, or at least 8°. Further, the offset 696 illustrated in FIGS. 6A and 6B is also exaggerated to more clearly illustrate the disclosed functionality. In some aspects, the offset 696 may preferably be approximately 2.5 mm. In some aspects, the offset 696 may be within a range of 1 to 4 mm, 1 to 3 mm, 2 to 4 mm, 2 to 8 mm, 3 to 10 mm, 5 to 15 mm, or the like.

In a cup that includes an offset (such as offset 696), the radial wall thickness of the cup may be different in different locations. For example, with reference to FIG. 6A, the upper cup 656 comprises a radial wall thickness 697 at a thinnest point and a radial wall thickness 698 at a thickest point. In some aspects, such as an aspect that includes approximately 2° of total angle adjustment range (plus or minus 1°), the thickness 698 is preferably approximately 7 mm, and thickness 697 is preferably approximately 2 mm. For an aspect that includes a larger angle adjustment range, the thickness 698 may be larger, such as, for example, approximately 22 mm with a total angle adjustment range of 8°. Some aspects may utilize a thickness 698 within a range of 4-10 mm, 5-12 mm, 6-15 mm, 10-25 mm, or the like. The thinnest thickness 697 may in some aspects be larger or smaller than 2 mm (such as, for example, within a range of 0.5-3 mm, 1-4 mm, 1.5-5 mm, or the like). In some aspects, it is preferable to have the thinnest wall thickness 697 be no less than 1 mm, such as to prevent damage to the annular cup during installation and handling. In some aspects, the thickness may be smaller, however, such as 0.5 mm. A smaller thickness may be more acceptable in a cup that is made from a stronger material, such as steel, as opposed to a cup made from aluminum. In some aspects, a cup may be made from a polymer, such as nylon. In some aspects, it may be desirable for the minimum wall thickness 697 to be greater than 1 mm for a polymer cup (such as, for example, no less than 3, 4, or 5 mm).

It should be noted that the various dimensions discussed above can also be influenced by the overall height of the head tube. For example, a taller head tube will yield a smaller angle change than a shorter head tube (if using the same upper and lower cups). In some aspects, the head tube height is preferably within a range of 90-130 mm. The techniques disclosed herein may be used with any bicycle, however, including mountain bikes which typically have a head tube height within a range of 80-200 mm, and other bicycles that may have a head tube height of up to about 400 mm.

It should be noted that, as discussed above, the curved surfaces of the cups and head tube do not necessarily have to be spherical. Having the curved surfaces be spherical can be an efficient way of manufacturing the components, and thus is preferred in some aspects. Other configurations are contemplated, however. For example, the curved surfaces may be designed to conform to a generally cylindrical radius of curvature, such as if circles 590 and 592 of FIGS. 5, 6A, and 6B were extruded out of the page and into the page. Such a configuration would still allow the upper and lower cups to rotate in the manners shown in FIGS. 6A and 6B to change the head angle. As another example, the upper and/or lower cups may be set up in a gimbal arrangement where one or more additional components, such as bearings, pins, bushings, and/or the like enable the forward and backward or clockwise and counterclockwise rotations illustrated in FIGS. 6A and 6B.

As yet another example of a variation on the designs shown in FIGS. 5, 6A, and 6B, in some aspects, one or both of the upper or lower cups may not be configured to rotate forward and backward (or clockwise and counterclockwise) as shown in FIGS. 6A and 6B. For example, an alternative version of the upper cup 656 of FIGS. 6A and 6B may utilize an inner surface 674 that is manufactured at an angle to the main body of the upper cup. Stated another way, a longitudinal axis defined by inner surface 674 may be inclined at an angle to the central axis $A_C$ of the upper cup 656. With such an arrangement, rotating the upper cup 656 by 180° about the head tube axis $A_H$ may accomplish a similar result as in FIGS. 6A and 6B (e.g., rotation of the steering axis forward or backward), without requiring the upper cup 656 itself to rotate forward or backward. In such an aspect, the lower cup 558 may still be designed to rotate forward and backward as shown in FIGS. 6A and 6B, or the lower cup 558 may be designed similarly to the alternative upper cup (e.g., with inner surface 576 manufactured at an angle to a central axis of the lower cup 558).

Further, some aspects may incorporate both concepts (e.g., manufacturing the inner surfaces 674 and/or 576 at an angle to the central axis of the cups and also allowing the cups to rotate forward and backward). The upper cup 256 illustrated in FIG. 3A incorporates such a design, although since the dimensions have not been exaggerated as in FIGS. 6A and 6B, the difference in angular alignment of the inner surface 374 with respect to the main body of the upper cup 256 is somewhat subtle. Looking closely at the upper cup 256 of FIG. 3A, however, it can be seen that the cylindrical shape defined by inner surface 374 is tilted slightly rearward (e.g., counterclockwise) with respect to the rest of the upper cup 256, such as with respect to the curved surface 370. With such a design, which combines both (1) forward and rearward rotatability of the upper cup 256 about curved surface 371 of the head tube and (2) the as-manufactured forward or rearward angular alignment of the inner surface 374, the resulting head angle H can be adjusted by a greater amount while requiring less forward or backward rotation of the upper cup 256. It should be noted that, although this aspect is describing features of the upper cup 256, other aspects may include similar features in both the upper and lower cups, or in only the lower cup.

Additional Features of Some Aspects

In order to more effectively implement the adjustable head angle features discussed above, it can be desirable to include one or more features that assist a user in inserting the control cup or cups into a receptacle or receiving portion in the head tube in an appropriate orientation and/or that limit rotation of the control cup(s) about the longitudinal axis of the head tube once inserted. FIGS. 4A-4F illustrate perspective views of three specific examples of how such features may be implemented. It should be noted that, although each of these examples illustrates an upper cup, similar techniques may be used for the lower cup, if desired.

Figure 4A:
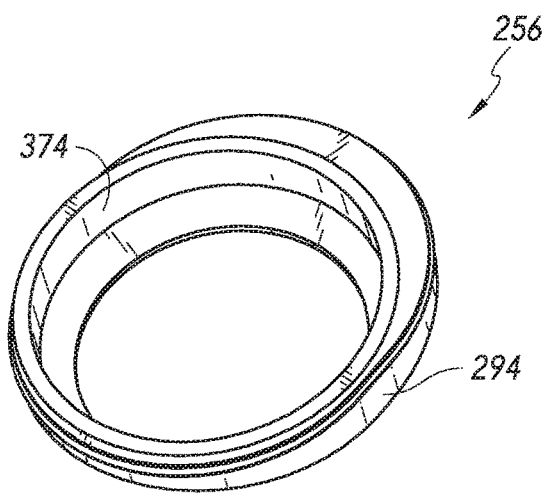
FIG. 4A is a perspective view of the upper cup of the adjustable headset assembly of FIG. 2.
Figure 4B:
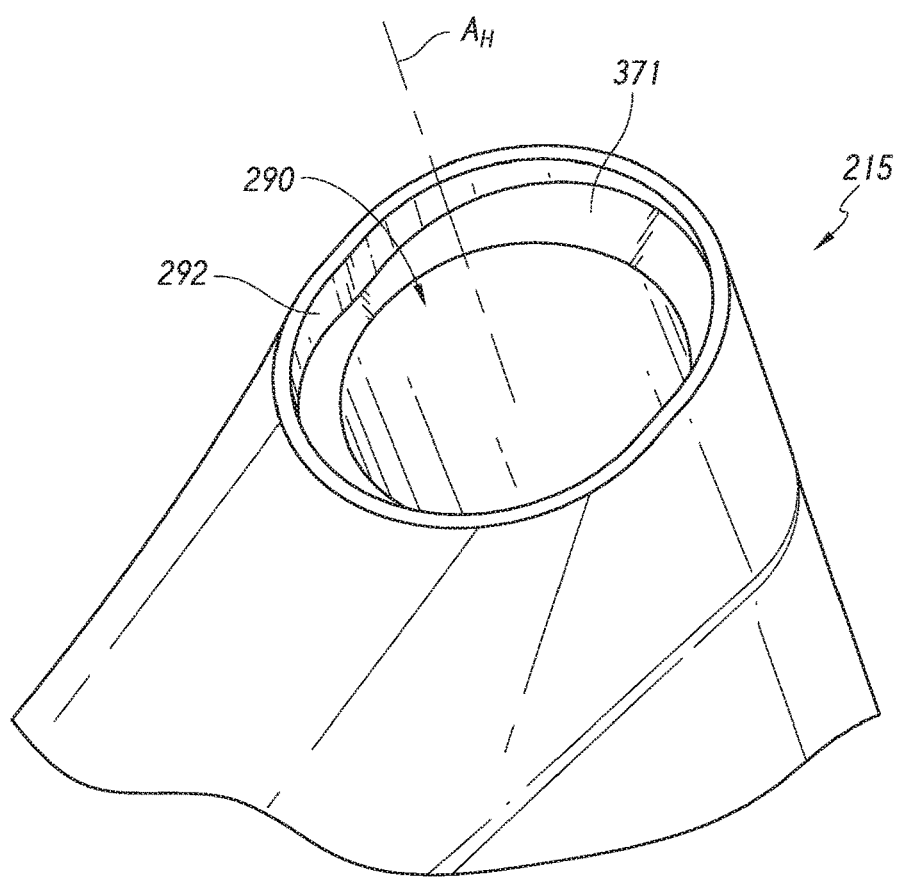
FIG. 4B is a perspective view of the head tube of the adjustable headset assembly of FIG. 2.

FIGS. 4A and 4B illustrate the upper cup 256 and head tube 215 of the aspect of FIGS. 3A-3C. In this aspect, the upper cup 256 and upper receptacle (or receiving portion) 290 of the head tube 215 are configured such that the upper cup 256 can be positioned within the receptacle 290 in two distinct orientations. The first orientation is as oriented in FIGS. 4A and 4B, with the inner surface 374 being offset rearward, and the second orientation (not shown) is with the upper cup 256 rotated 180° about the longitudinal axis $A_H$ of the head tube 215, with the inner surface 374 being offset forward. These two orientations are accomplished by the receptacle 290 of the head tube 215 comprising an inner surface 292 that is shaped in a non-circular manner. The upper cup 256 further comprises an outer surface 294 that is shaped in a complementary non-circular manner. In this aspect, the shapes of the inner and outer surfaces 292, 294 are desirably racetrack shaped, oval shaped, or the like. The term racetrack shaped is intended to refer to a shape that is similar to an oval shape, but that comprises straight or nearly straight sides that connect the radiused ends (similar to the shape of a typical "oval track" automobile racetrack). By using such shapes, there are only two orientations of the upper cup 256 that will allow the upper cup 256 to be positioned within the receptacle 290 with the curved surfaces 370, 371 in contact.

The configuration illustrated in FIGS. 4A and 4B can be desirable to use in a bicycle frame that is conducive to such manufacturing, such as, for example, a carbon fiber bicycle frame. For bicycles that utilize bicycle frames that are more conducive to machining manufacturing techniques, such as bicycle frames made out of steel, aluminum alloy, and/or the like, the aspects illustrated in FIGS. 4C and 4D, and 4E and 4F may be more desirable. This is not to say, however, that a carbon fiber head tube may not use the techniques shown in FIGS. 4C-4F, or that an aluminum alloy head tube may not use the techniques shown in FIGS. 4A and 4B.

Figure 4C:
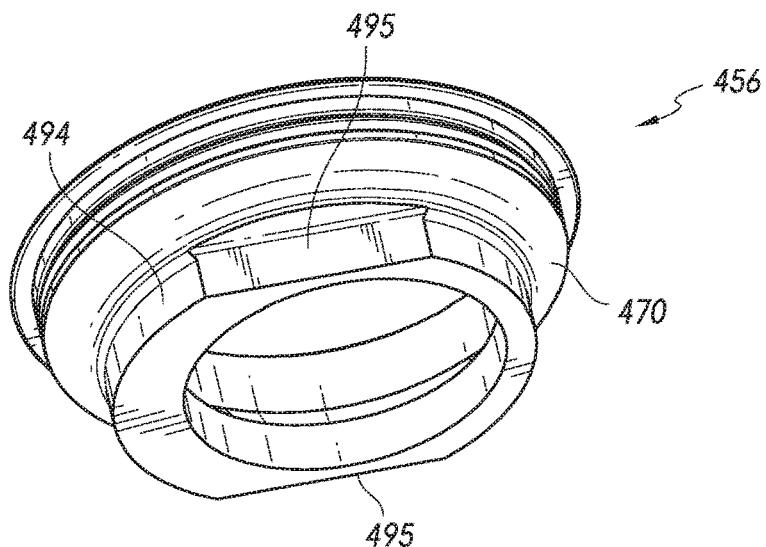
FIG. 4C is a perspective view of an upper cup of another aspect of an adjustable headset assembly.
Figure 4D:
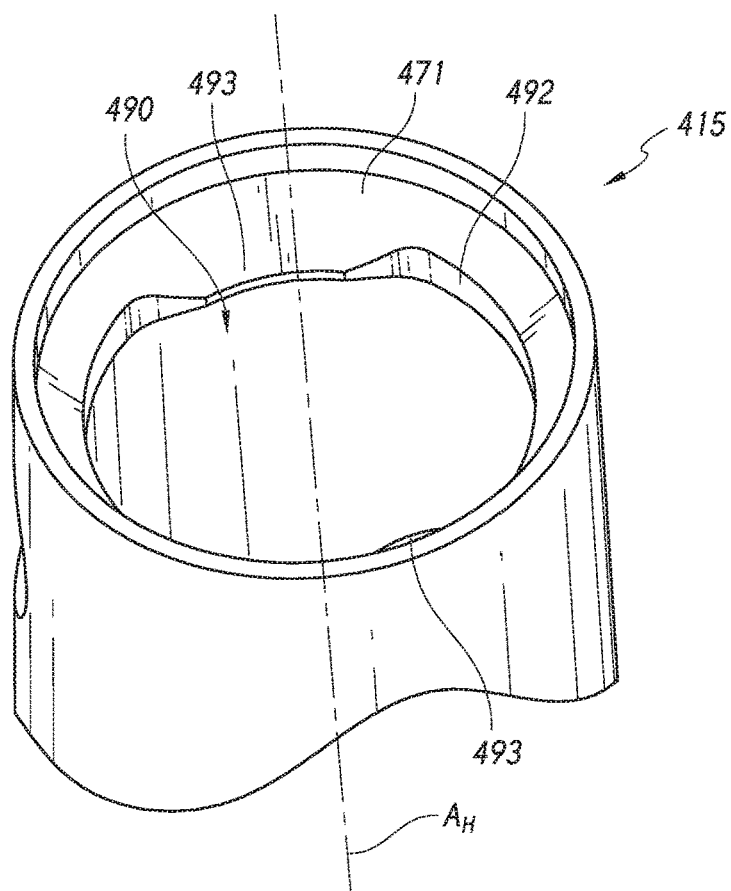
FIG. 4D is a perspective view of a head tube of the adjustable headset assembly of FIG. 4C.

Turning now to FIGS. 4C and 4D, FIGS. 4C and 4D illustrate another configuration that can be used to keep a cup in a specific rotational orientation with respect to a head tube. These figures illustrate an upper cup 456 that can be designed to fit within receptacle 490 of a head tube 415. When inserted into the receptacle 490, curved surface 470 of the upper cup 456 can be positioned to engage curved surface 471 of the head tube 415.

The designs of the upper cup 456 and head tube 415 can be similar to the designs discussed above with reference to upper cup 256 and head tube 215, except that a different technique for rotationally locating the upper cup 456 with respect to the head tube 415 is used. Specifically, instead of using a surface of the head tube that is radially outward of the head tube's curved surface 371, this aspect uses a surface of the head tube that is radially inward of the head tube's curved surface 471. Specifically, inner surface 492 of the receptacle 490 comprises a noncircular profile that is shaped and sized to allow noncircular outer surface 494 of the upper cup 456 to be inserted therein. The outer surface 494 of the upper cup 456 desirably comprises two radially recessed portions or flats 495 that correspond to two radial protrusions 493 of inner surface 492 of the head tube receptacle 490. These complementary recesses 495 and protrusions 493 act similarly to the noncircular profiles of the aspect shown in FIGS. 4A and 4B in order to enable the upper cup 456 to be positionable within the receptacle 490 in only two orientations with curved surface 470 in contact with curved surface 471. The recesses 495 and protrusions 493 are desirably positioned at the left and right sides of the head tube (as viewed by a rider riding the bicycle in a standard riding position) so that the recesses 495 and protrusions 493 do not resist forward and backward rotation of the upper cup 456. Similarly, the aspect shown in FIGS. 4A and 4B desirably positions the flat or straight portions of the "racetrack" design at the left and right sides of the head tube, for similar reasons.

Figure 4E:
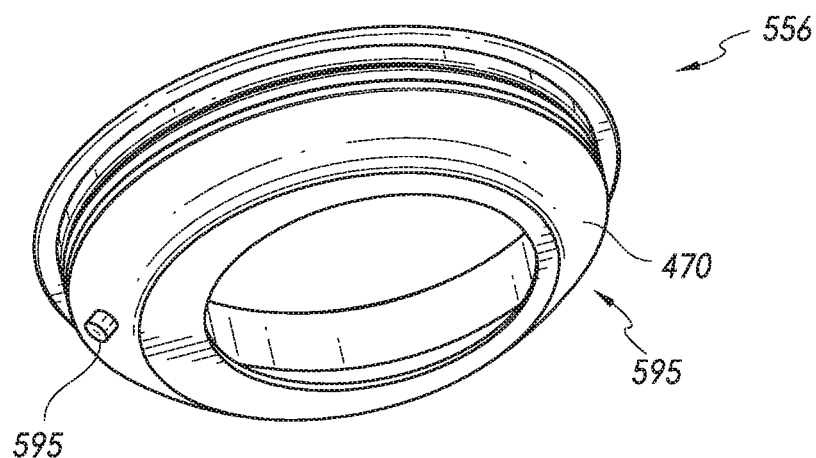
FIG. 4E is a perspective view of an upper cup of another aspect of an adjustable headset assembly.
Figure 4F:
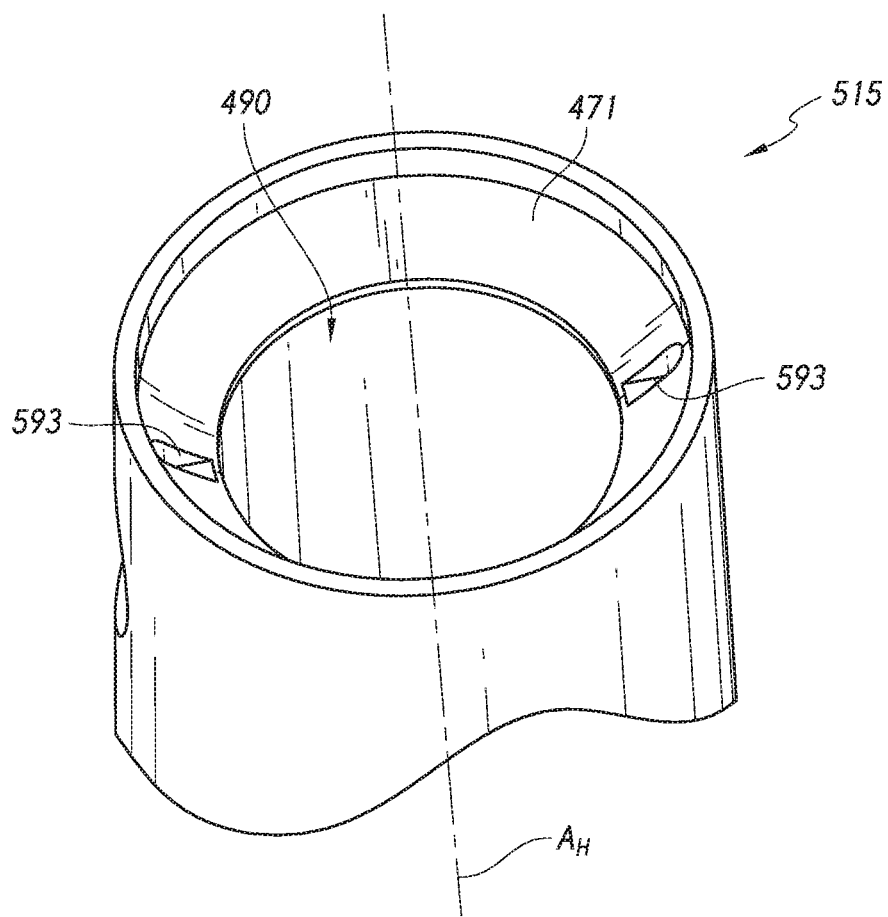
FIG. 4F is a perspective view of a head tube of the adjustable headset assembly of FIG. 4E.

FIGS. 4E and 4F illustrate yet another aspect of a design that allows an upper cup to be maintained in a specific rotational orientation with respect to the head tube. Specifically, in this aspect, upper cup 556 is maintained in a specific rotational orientation with respect to receptacle 490 in head tube 515 by two protrusions 595 that protrude from curved surface 470 of the upper cup 556, and two corresponding recesses 593 in curved surface 471 of the head tube 515. Although the second protrusion 595 is not shown in the perspective view of FIG. 4E, the second protrusion 595 is desirably positioned opposite the first protrusion 595 (e.g., the feature is mirrored across a plane that extends from left to right and includes the head tube axis $A_H$). In some aspects, the protrusions 595 comprise pins, screws, and/or the like that are attached to the upper cup 556 in a secondary manufacturing operation. In some aspects, the protrusions 595 are integrally formed into the upper cup 556. Desirably, the recesses 593 in the head tube 515 are aligned with a vertical, central plane that generally bisects the bicycle, and shaped such that the lateral sides of the recesses 593 are close to and/or are in contact with the protrusions 595, thus limiting rotation of the upper cup 556 about the longitudinal axis $A_H$ of the head tube 515. But the recesses 593 are desirably also shaped such that there is some clearance between the protrusions 595 and recesses 593 along the fore/aft direction, thus allowing the upper cup 556 to rotate forward and rearward somewhat (e.g., as shown in FIGS. 6A and 6B) when adjusting the head angle of the bicycle.

It should be noted that other techniques for constraining the rotational orientation of a cup to a head tube may also be used, and in some aspects, a cup may be adequately constrained with respect to the head tube without needing to include a separate feature specifically added for that purpose. For example, if the curved surfaces of the cup and head tube utilize a cylindrical radius of curvature instead of a spherical radius of curvature, mating the curved surface together may adequately constrain the cup's rotation about the axis of the head tube without using separate features.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as further discussed above, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle, comprising:
a frame comprising a head tube, the head tube comprising an upper receiving portion and a lower receiving portion,
the upper receiving portion comprising an upward facing curved surface, the lower receiving portion comprising a downward facing curved surface;
a front fork assembly comprising a steerer tube;
a rear wheel rotatably coupled to the frame;
a front wheel rotatably coupled to the front fork assembly; and
an adjustable headset assembly that rotatably couples the steerer tube to the head tube about a steering axis, the adjustable headset assembly being configurable to adjust the orientation of the steering axis with respect to the head tube to change a head angle of the bicycle, wherein the adjustable headset assembly comprises:
an upper cup receivable in the upper receiving portion of the head tube, the upper cup comprising a downward facing curved surface having a curvature that is complementary to the upward facing curved surface of the upper receiving portion;
an upper bearing comprising an outer race that engages an inner surface of the upper cup and an inner race that engages the steerer tube;
a lower cup receivable in the lower receiving portion of the head tube, the lower cup comprising an upward facing curved surface having a curvature that is complementary to the downward facing curved surface of the lower receiving portion; and
a lower bearing comprising an outer race that engages an inner surface of the lower cup and an inner race that engages the steerer tube,
wherein the inner surface of the upper cup defines an axis that is collinear to the steering axis and that is offset from an axis defined by the curved surface of the upper cup, to permit the steering axis to be positioned offset from an axis defined by the head tube, and
wherein the inner surface of the lower cup defines an axis that is collinear to the steering axis and that is not offset from an axis defined by the curved surface of the lower cup.

2. The bicycle of claim 1, wherein the inner surface of the upper cup permits the steering axis to be positioned in a first position offset from the axis defined by the head tube and a second position offset from the axis defined by the head tube.

3. The bicycle of claim 1, wherein the upper cup is receivable in the upper receiving portion of the head tube in at least a first orientation and a second orientation, the first orientation defining a first head angle, and the second orientation defining a second head angle that is different than the first head angle.

4. The bicycle of claim 3, wherein the upper cup comprises a protrusion or a recessed portion that engages a corresponding protrusion or recessed portion of the head tube to resist rotation of the upper cup with respect to the upper receiving portion of the head tube.

5. The bicycle of claim 3, wherein the upper cup comprises at least one surface having a non-circular shape that engages a corresponding non-circular shaped surface of the head tube to resist rotation of the upper cup with respect to the upper receiving portion of the head tube.

6. The bicycle of claim 1, wherein the upper cup is removable and replaceable with a third cup that comprises a different relative positioning of inner surface to curved surface.

7. The bicycle of claim 1, wherein the curved surfaces of the receiving portions and cups each comprise a spherical radius of curvature.

8. The bicycle of claim 7, wherein the spherical radius of curvature for each of the curved surfaces of the receiving portions and cups is within a range of 30-50 mm.

9. The bicycle of claim 1, wherein the axis defined by the inner surface of the upper cup is offset from the axis defined by the curved surface of the upper cup by 2-8 mm.

10. They bicycle of claim 1, wherein the upper cup and the lower cup are sized such that they do not form an interference fit with their respective receiving portion of the head tube.

11. The bicycle of claim 1, wherein the upper receiving portion and lower receiving portion are integrally formed in the head tube.

12. The bicycle of claim 1, wherein the frame comprises a main frame portion and an articulating frame portion, wherein the rear wheel is rotatably coupled to the articulating frame portion.

13. The bicycle of claim 1, wherein the adjustable headset assembly comprises a total range of head angle adjustability of at least 1.5°.

14. The bicycle of claim 1, wherein the inner surfaces of the upper cup and the lower cup are configured such that the steering axis intersects the axis defined by the head tube at a point that is below the lower bearing.

15. An adjustable head angle bicycle assembly, comprising:
  a steerer tube that extends along a longitudinal axis;
  a head tube comprising an upper end, a lower end, and an inner wall, the head tube further comprising a first annular surface protruding radially inward from the inner wall at the upper end, and a second annular surface protruding radially inward from the inner wall at the lower end;
  an upper cup comprising a third annular surface engaged with the first annular surface of the head tube;
  an upper bearing that controls a lateral position of an upper portion of the steerer tube, the upper bearing comprising an outer race,
  the upper cup further comprising an inner surface that engages with and controls a lateral position of the outer race of the upper bearing with respect to the upper end of the head tube;
  a lower cup comprising a fourth annular surface engaged with the second annular surface of the head tube; and
  a lower bearing that controls a lateral position of a lower portion of the steerer tube, the lower bearing comprising an outer race,
  the lower cup further comprising an inner surface that engages with and controls a lateral position of the outer race of the lower bearing with respect to the lower end of the head tube,
  wherein the inner surface of the upper cup defines a first axis that is not collinear with a second axis defined by the annular surface of the upper cup, and
  wherein the inner surface of the lower cup defines an axis that is not offset from an axis defined by the annular surface of the lower cup.

16. The adjustable head angle bicycle assembly of claim 15, wherein the first, second, third, and fourth annular surfaces each comprise a curved surface.

17. The adjustable head angle bicycle assembly of claim 15, wherein the first, second, third, and fourth annular surfaces each comprise a spherical radius of curvature.

18. The adjustable head angle bicycle assembly of claim 15, wherein the first axis is parallel to the second axis.

19. The adjustable head angle bicycle assembly of claim 15, wherein the first axis is not parallel to the second axis.

20. The adjustable head angle bicycle assembly of claim 15, wherein the upper cup comprises a shape that fits into the upper end of the head tube in at least two different orientations, and that resists rotation of the upper cup with respect to the head tube when fitted into the upper end of the head tube in the at least two different orientations.

21. The adjustable head angle bicycle assembly of claim 20, wherein the at least two different orientations comprises a first orientation that defines a first head angle and a second orientation that defines a second head angle, and wherein a difference between the first head angle and the second head angle is at least 1.5°.

22. A method of adjusting a bicycle head angle, the method comprising:
  providing a bicycle assembly comprising:
    a steerer tube that extends along a longitudinal axis;
    a head tube comprising an upper end, a lower end, and an inner wall, the head tube further comprising a first annular surface protruding radially inward from the inner wall at the upper end, and a second annular surface protruding radially inward from the inner wall at the lower end;
    an upper cup comprising a third annular surface engaged with the first annular surface of the head tube;
    an upper bearing that controls a lateral position of an upper portion of the steerer tube, the upper bearing comprising an outer race,
    the upper cup further comprising an inner surface that controls a lateral position of the outer race of the upper bearing with respect to the upper end of the head tube,
    wherein the inner surface of the upper cup is offset laterally in a first direction from the third annular surface; and
    a lower cup comprising a fourth annular surface engaged in a first orientation with the second annular surface of the head tube, the lower cup further comprising an inner surface that controls a lateral position of a lower portion of the steerer tube with respect to the lower end of the head tube,
    wherein the inner surface of the lower cup is not offset laterally from the fourth annular surface;
  removing the upper cup; and
  replacing the upper cup in an orientation that is rotated 180 degrees about the longitudinal axis, causing the inner surface of the upper cup to be offset in a second direction opposite the first direction, and causing the lower cup to pivot with respect to the head tube such that the fourth annular surface of the lower cup is engaged in a second orientation with the second annular surface of the head tube.

* * * * *